United States Patent [19]

Gräfe et al.

[11] 4,283,163
[45] Aug. 11, 1981

[54] CUTTING TOOL WITH REPLACEABLE EDGE CUTTING BIT

[75] Inventors: Werner Gräfe, Reutlingen; Willy Schlotterer, Nehren, both of Fed. Rep. of Germany

[73] Assignee: Montanwerke Walter GmbH, Tübingen, Fed. Rep. of Germany

[21] Appl. No.: 116,536

[22] Filed: Jan. 29, 1980

[30] Foreign Application Priority Data

Feb. 17, 1979 [DE] Fed. Rep. of Germany ....... 2906148

[51] Int. Cl.³ .............................................. B26D 1/12
[52] U.S. Cl. .................................................. 407/104
[58] Field of Search ................... 407/48, 103, 104, 105

[56] References Cited

U.S. PATENT DOCUMENTS

| | | | |
|---|---|---|---|
| 3,341,920 | 9/1967 | Kelm | 407/104 |
| 3,533,150 | 10/1970 | Welch | 407/104 |
| 3,540,102 | 11/1970 | Yogus et al. | 407/104 |
| 3,654,682 | 4/1972 | Newbould | 407/104 |
| 3,946,473 | 3/1976 | Peterson | 407/105 |

*Primary Examiner*—Harrison L. Hinson
*Attorney, Agent, or Firm*—Frishauf, Holtz, Goodman & Woodward

[57] ABSTRACT

To provide for positive guidance of a bolt formed with a conical enlarged intermediate portion holding a cutter bit by resilient deflection of the bolt in an enlarged recess portion of the cutter bit, the enlarged recess portion is formed as an elongated portion adjacent a bore in which the bolt is threaded, the elongated opening being additionally formed with conical surfaces concentric with the bore so that, prior to resilient deflection of the bolt, the bolt is positively guided and, thereafter, the elongated opening permits deflection of the bolt, the length axis of the elongated enlarged portion being directed towards an abutment surface on the tool body to securely clamp the bit against the abutment surface and determine the direction of resilient deflection of the bolt.

9 Claims, 6 Drawing Figures

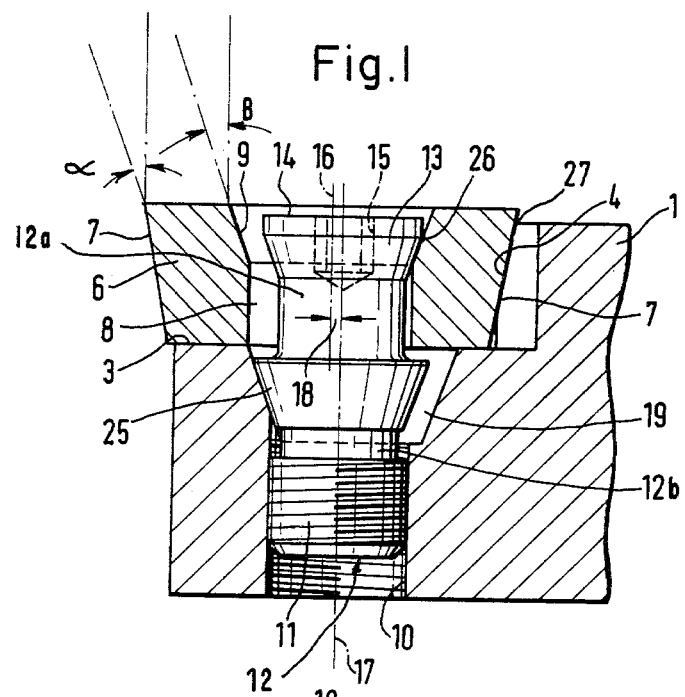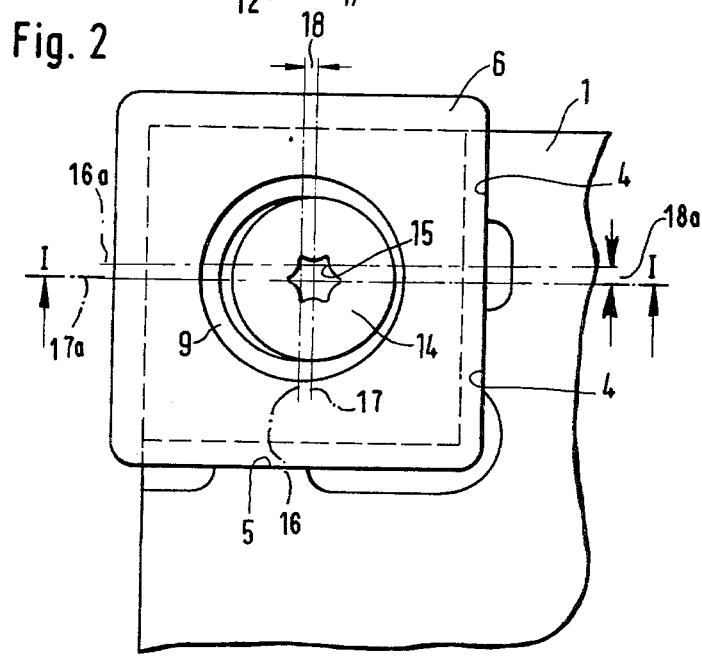

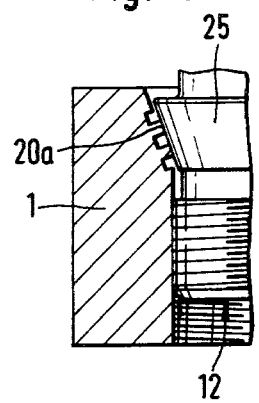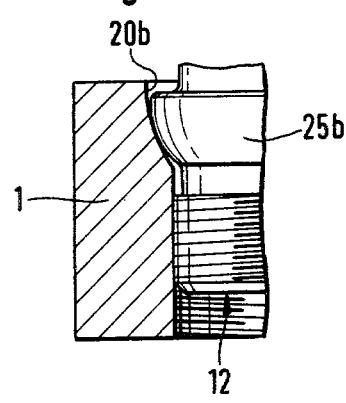

CUTTING TOOL WITH REPLACEABLE EDGE CUTTING BIT

The present invention relates to a cutting tool with a replaceable edge cutting bit, in which the cutting bit is, for example, essentially rectangular or parallelogram-shaped and selectively positionable so that a sharp cutting edge can always be presented to a workpiece.

BACKGROUND AND PRIOR ART

Various types of cutting tools use rotatable bits which can be clamped in selected positions on a cutting tool holder or body. In one such cutting tool—see German Pat. No. 1,552,296—a clamping bolt can be inserted in a bore in the cutting body and threaded therein to clamp the cutter bit with the conical head against the body itself. The clamping bolts fits into a circular conical enlargement of the bore which is offset with respect to the center of the clamping hole in the cutter bit. When the clamping bolt is screwed into the tapped bore of the holder, the conical portion of the bolt will engage at the inner wall of the conical recess therein and is laterally elastically deflected. This elastic deflection presses the cutter bit against abutment surfaces on the body. The enlarged portion of the bore must be big enough to permit lateral deflection of the bolt; thus, its diameter in all respective section planes is greater than the diameter of the conical portion of the clamping bolt in the same section plane. Consequently, the conical portion of the clamping bolt engages the inner wall of the conical recess only along a single line. The maximum diameter of the clamping head of the clamping bolt must be smaller than the smallest diameter of the hole in the cutter bit since, otherwise, the cutter bit cannot be placed on the clamping bolt without entire removal thereof from the tool. The clamping head of the bolt also engages the cutter bit along the single line.

When engaging the bolt with a cutter bit which, in turn, engages the respective abutment surfaces on the tool, and the bolt is resiliently deflected, the bolt is no longer guided with respect to the tool body. The position of the engagement line between the conical portion of the bolt and the inner wall of the conical recess in the tool body, as well as between the clamping head of the bolt and the bit itself is indeterminate due to play in the threads between the bolt and the body. In many machine tools, and particularly in machine tools in which the tool elements are highly stressed, it is important to ensure that the contact zone between the clamping head and the inner wall of the cutter bit has a defined predetermined position with respect to the abutment surfaces on the tool body.

THE INVENTION

It is an object to improve a tool with a cutter bit in such a manner that the clamping force between the holding bolt and the cutter bit can be precisely defined and positioned so that the bit is reliably clamped to the tool body in accordance with predetermined design criteria, and not subject to random variation.

Briefly, in accordance with the invention, the enlarged portion or recess in the bore is of elongated shape having a length which is greater than the diameter of the conical intermediate portion on the clamping bolt. A subportion of the enlarged conical portion, which extends over part only of the elongated enlarged portion, has a circular cross section with a circle axis which coincides with the axis of the bore in the tool in which the bolt is threaded, to provide for part-circumferential surface guidance of the conical intermediate portion of the bolt. The longitudinal axis of the elongated enlarged portion is directed toward at least one of the lateral abutment surfaces formed on the tool body to draw the bit, upon tightening of the bolt in the bore, against a flat support surface formed on the tool body and additionally against abutment surfaces formed laterally thereon. The elongated shape of the enlarged portion permits deflection of the bolt in a predetermined direction only, whereas the match of the circumferential subportion of the enlarged conical recess with the conical intermediate portion of the clamping bolt provides for precise and proper guidance.

The tool holder with the cutter bit may be used for various types of machine tools, for example as a lathe cutter tool, for milling cutters, boring tools, drills, and generally in all machine tools in which a replaceable cutter bit is clamped to a tool holder.

DRAWINGS

FIG. 1 is a vertical cross-sectional view through a cutter body or holder with a bit inserted therein, and which is clamped by the bolt, shown in side view, to the cutter holder or body;

FIG. 1a is a fragmentary sectional view showing a different embodiment of an engagement surface between the conical portion of the bolt and the tool body;

FIG. 1b is a fragmentary view similar to FIG. 1a and showing another embodiment;

FIG. 2 is a top view of the assembly of tool holder and cutter bit of FIG. 1, and showing the section line I—I along which FIG. 1 is cut;

The tool holder 1 can be fixed, for example to hold a lathe bit, or can be rotable, for example can be the cutter head of a milling machine, a boring tool, or the like. The basic arrangement of replaceable, rotatable cutter bits on such tool holders is well known and the present invention can be applied to various types of such machine tool holders.

Figure 3:
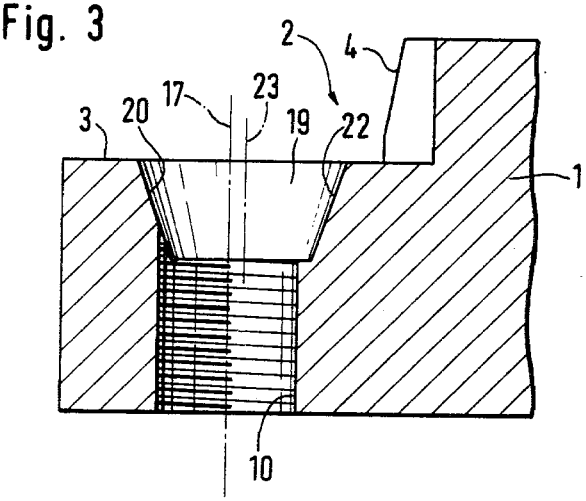
FIG. 3 is a fragmentary longitudinal sectional view along line III—III of FIG. 4 and illustrating only the tool holder or body.
Figure 4:
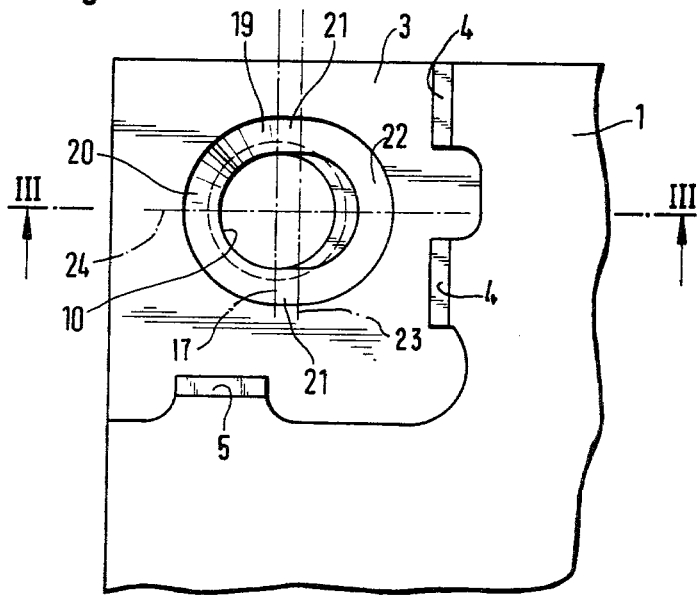
FIG. 4 is a top view of the tool holder of FIG. 3.

The tool body 1 has a pocket-like recess 2 (FIG. 3) which defines a flat support surface 3 and lateral abutment surfaces 4, 5 (FIGS. 1, 3, 4). The two lateral abutment surfaces 4 are in one common plane; at right angles thereto, another abutment surface 5 is provided (FIG. 4). As best seen in FIGS. 1 and 3, and there illustrated with respect to surface 3, the respective surfaces 4, 5 are formed an outwardly inclined portion.

The recess 2 receives a cutter bit 6 which is made of hard metal. The cutting edge is defined by a line, and preferably relieved with a relief angle $\alpha$. One of the flat surfaces engages the support surface 3; two adjacent lateral surfaces 7 engage the abutment surfaces 4, 5. The cutter bit 7 is formed with a through-opening 8 in form of a cylindrical bore which, towards its upper side, merges in a conical countersink 9.

A tapped bore 10 is formed in the tool body 1, extending perpendicularly with respect to the support surface 3. A clamping bolt 12, with a threaded portion 11 is threaded into a tapped bore 10. The clamping bolt 12 has a clamping head 13 at the side remote from the threaded portion 11. The clamping head 13 tapers outwardly towards its free surface 14, so that the clamping head 13, generally, has frusto-conical shape. The cone angle of the head 13 corresponds at least approximately to the angle of the countersink 9 in the cutter bit 6. The head 14 is additionally formed with a recess 15 to receive a tool such as an Allen wrench, a star wrench, or the like, to turn the bolt 12 to thread it into the bore 10. The bolt 12 is, additionally, formed with a conical enlargement 25 intermediate the length thereof. The enlargement 25 is spaced from the head 13 by a straight shank portion 12a; the enlargement 25 is spaced from the threaded portion 11 by a shank portion 12b. The cone angle of the conical enlargement 25 matches the cone angle of a recess 19 in the body 1, as will be explained in detail below.

To ensure reliable engagement of the cutter bit 6 with respect to the lateral abutment surface 4, the axis 16 of the cylindrical portion of the opening 8 in the cutter bit 6 is offset with respect to the axis 17 of the bore 10 by a distance 18 (FIG. 2).

To ensure secure abutment of the cutter bit 6 towards the abutment surfaces 5, the axis 16a of the cutter bit 6, extending transversely to axis 16, is offset with respect to the axis 17a of the tapped bore 10, transverse to axis 17, in the direction of the abutment surface 5 by the offset distance 18a. The arrangement of the respective centers is best seen in FIG. 2.

The largest diameter of the clamping head 13 is smaller than the diameter of the through-opening 8 in the cutter bit 6, so that the cutter bit 6 can be slipped on the bolt 12, if the bolt 12 is somewhat screwed out of the bore 10.

The foregoing is the preferred arrangement; other arrangements may be used; for example, the axis 17 of the bore 10 can extend with respect to the surface 3 at an angle; the offset 18 between the axis 17 and axis 16 (FIG. 2) can also be placed along a line which is other than straight. The axes 16a and 17a can also be placed so as to be coincident.

The tool holder 1 is formed with a recess 19 into which the conical portion 25 of the bolt fits. Recess 19 extends from the bore 10.

In accordance with the invention, the recess 19 has the shape of an elongated hole (FIG. 4) which has a major axis extending towards the abutment surfaces 4. The elongated opening 19, in the region of one end portion thereof, has a conical region 20. The inner surface of the conical portion is coaxial with respect to the bore 10 (axis 17). In parallel section planes, therefore, the conical portion 20 always is circular, with the center coinciding with the center of the axis 17.

The elongated portion of the opening 19 extends from the conical region 20 to form an essentially flat, horizontally (with respect to FIG. 2) extending zone 21. The conical portion 20 extends over about 180°, the cone narrowing towards the bore 10. The surfaces in zone 21 taper inwardly, that is, have the same taper angle as the side wall of the conical zone 20. Joined to the straight zone 21 is a further conical zone 22 which is the mirror image of conical zone 20. Zone 22 likewise extends over an arc of about 180° and tapers downwardly towards the bore 10 without, however, merging therein, as best seen in FIG. 3.

The transverse axis 23 of the elongated recess 19 is offset with respect to the axis 17 of the bore 10 in the direction of the lateral abutment surface 4—see FIG. 4. The longitudinal axis 24 of the elongated recess extends essentially, or at least approximately, at right angles to the abutment surfaces 4.

The conical portion 25 of the bolt 12 has a cone angle which matches the cone angle of the zone 20 of the elongated recess 19. Its diameter is so selected that, in the conical region 20, the conical portion 25 will snugly engage the entire inner surface of the elongated opening 19 in the engire conical region 20.

Function and assembly of cutter bit: To assemble a bit 6 to the tool holder 1, the bolt 12 is partially screwed out of bore 10. A cutter bit 6 is slipped over the head of the bolt and positioned as shown in FIG. 1, to fit against the support surface 3. Upon tightening of bolt 12, the conical intermediate portion 25 thereof will engage the conical portion 20 of the elongated recess 19 where it will fit snugly against the entire inner surface of the conical portion, that is, about an arcuate extent of approximately 180°. This results in lateral guidance of the bolt 12, at right angles to the longitudinal axis 24. Upon further tightening of the bolt 12 by continuing to thread the threaded portion 11 into the threaded bore 10, the bolt 12 will deflect about approximately the root of the threaded portion 11 in the direction of the longitudinal axis 24 towards the abutment surface 4. The deflection will cause elastic deformation. By engagement of the conical head 13 of the bolt with the countersink portion 9 of opening 8 in the cutter bit 6, the cutter bit 6 is snugly pressed against the support surface 3 and against the abutment surfaces 4, 5. The half-cone angle $\beta$ of the countersink portion 9 in the opening 8 of the cutter bit 6 is selected to be greater than the relief angle of the bit 6—see FIG. 1—and, also, greater than the relief angle of the edge between two adjacent free surfaces 7 of the cutter bit 6. The cutter bit 6 is a positive cutter bit. Consequently, the cutter bit 6 will be securely held on the tool body 1 when the bolt 12 is tightened.

The cutter bit 6 is prevented from tipping upon tightening of the bolt 12 by so fitting the respective size of the head 13 and the opening 8 and countersink 9 with respect to the thickness of the bit 6 that the upper engagement point 16 of the head 13 on the inner wall of the countersunk portion 9 is lower than the upper engagement point 27 of the cutter bit 6 on the lateral support surfaces 4 or 5, respectively—when looked at parallel to a plane parallel to the support surface 3—see FIG. 1. It is also possible to so arrange the relative engagement positions that the engagement points 26, 27 are of approximately equal height, although the position shown in FIG. 1, with engagement point 26 below point 17, is preferred.

Friction between the conical enlargement 25 and the conical recess 19, and particularly between the enlargement 25 and zone 20, can be decreased by forming the region 20 of the elongated recess 19 to have at least two raised ridges 20a (FIG. 1a), the outer surfaces of which define the conical surface generally shown at 20 in FIGS. 3 and 4. The conical portion 25 of the bolt 12 will then engage the ridges 20a. These ridges can be located only in the region 20, or can extend around the longitudinal recess 19. The converse arrangement might also be used, that is, by cutting grooves into the conical intermediate projecting portion 25, which will result in the same effect as the ridges 20a.

Various changes and modifications may be made. For example, the conical portions need not have a straight configuration—in cross section; for example, the configuration may be selected to be part-spherical, so that the actual shape of the conical region 20 of the elongated opening 19 is curved, as seen in FIG. 1b at 20b. The conical intermediate portion 25 then, likewise, should have a similarly part-spherical outer surface as seen at 25b, FIG. 1b. The engagement zones between the respective portions 25b, 20b then will be along a curved line, typically a portion of a circle, the length of which is defined by the circumference of the conical region 20. Since the exact engagement shape can be selected in accordance with preferred manufacturing technology, and the surfaces will be essentially conical, the term "conical surface" will be employed to describe the generally straight-line or curved-line conical configuration.

The conical region of the enlarged recess 19 thus corresponds in its cross section to the conical region of the intermediate conical portion 25, 25b to provide exact lateral guidance, since the axis of the conical region is coaxial to the axis 17, 17a of the tapped bore 10. Simultaneously, however, the elongated recess 19 permits elastic lateral deflection of the bolt 12, which is necessary to securely clamp the bit 6 against the tool body 1.

The conical region of the elongated recess 19 preferably extends over about 180° of its circumference. Beyond the conical region, the elongated opening can basically have any suitable profile; it is only necessary to ensure that the bolt 12 can elastically deflect when being tightened. Particularly good geometric relationships for the bolt are obtained if the recess 19 is conical at both ends.

The longitudinal axis 24 of the elongated recess 19 is so directed that it provides the most suitable direction of clamping with respect to the abutment surfaces 4, 5 on the body 1, so that the bit 6 is securely clamped against the abutment surfaces which are most stressed. The longitudinal axis 24 of the elongated recess 19 preferably extends at right angles to one of the lateral engagement surfaces 4, 5.

Usually, the conical region of the inner wall of the elongated recess 19 is formed as the circumference of a straight cone, and the intermediate conical portion 25 likewise is formed as a straight frusto-conical element, with a cone angle which corresponds to the cone angle of the elongated recess 19. This arrangement provides for an engagement surface between the inner wall of the elongated recess and the conical intermediate portion of the bolt over the entire circumference of the conical region and over its entire height—that is, over an arcuate extent of about 180° and over the height of the conical intermediate portion 25. Friction, which arises upon tightening of the bolt in the region of the engagement forces can be decreased by forming the surfaces to be curved—see FIG. 1b—or at least one of the surfaces to be slightly curved, so that engagement between the conical portion of the bolt and the inner wall of the recess 19 is only along a half-circular line extending in a plane essentially parallel to the support surface 3, which is the plane along which guidance between the bolt and the thread as well as the bit is required. Friction can also be reduced by forming the engagement surface with raised bead ridges (FIG. 1a) against which the conical portion of the bolt can engage.

The tool is preferably used for use with positive cutter bits, having a wedge angle less than 90°, but it can be used also with negative cutter bits, having a cutter edge angle of 90°.

Various changes and modifications may be made, and features described in connection with any one of the embodiments may be used with any of the others, within the scope of the inventive concept.

We claim:

1. Cutting tool to hold a replaceable, rotatable cutting bit (6) having
    a cutter body (1) formed with
        a plane support surface (3) to support the bit (6);
        lateral abutment surfaces (4, 5) to position the bit thereagainst;
        a bore (10) extending into the cutter body from the support surface in a direction at least generally perpendicular to the support surface and being formed with an enlarged recess portion (19);
    and a clamping bolt (12) to releasably clamp the bit (6) on the support surface and against the abutment surfaces, screwed into the bore (10), said clamping bolt having an at least part-conical clamping head (13, 14, 15) fitting into a clamping opening (8, 9) formed in the bit, and an enlarged conical intermediate portion (25), radially projecting from the shank (25a, 25b) of the bolt and fitting into the enlarged recess portion (19) of the bore (10) in the cutter body (1);
    and wherein, in accordance with the invention,
    the enlarged portion (19) is of elongated shape having a length which is greater than the diameter of the conical intermediate portion (25) of the clamping bolt (12),
    a subportion of said enlarged conical portion extending over part only of said enlarged portion having circular cross section and a circle axis which coincides with the axis (17) of the bore (10) to provide for part-circumferential surface guidance of the conical intermediate portion (25) of the bolt (12);
    and wherein the length axis (24) of the elongated enlarged portion extending transverse to the axis (17) of the bore is directed towards at least one of the lateral abutment surfaces (4, 5) of the body to draw the bit, upon tightening of the bolt (12) in the bore, against the support surface and against the abutment surface, the elongated enlarged portion permitting resilient deflection of the bolt between the part thereof which is screwed into the bore and the clamping head.

2. Tool according to claim 1, wherein the elongated enlarged portion (19) is formed with conical surfaces at both its ends (20, 22) and with intermediate converging portions (21) smoothly merging with the surfaces of the conical portions (20, 22).

3. Tool according to claim 1, wherein the conical region (20) of the elongated enlarged portion of the recess (19) extends over about 180°.

4. Tool according to claim 3, wherein both end portions (20, 22) of the elongated enlarged recess portion (19) are conical.

5. Tool according to claim 1, wherein the length axis (24) of the elongated enlarged recess portion (19) extends at an essentially right angle with respect to one of the abutment surfaces (4, 5).

6. Tool according to claim 1, wherein (FIG. 1a) at least one of the conical surfaces of the conical intermediate portion (25) of the bolt and of the elongated enlarged recess portion (19) is part-spherical.

7. Tool according to claim 1, wherein the clamping opening (8, 9) in the bit (6) has a conical countersunk end portion (9) at the side remote from the support surface (3);
    and wherein the half-cone angle ($\beta$) of the countersunk portion (9) of the clamping opening in the bit is greater than the recess angle ($\alpha$) of the cutting edge between adjacent free cutting surfaces (7) of the cutter bit (6).

8. Tool according to claim 7, wherein the at least part-conical clamping head (13, 14, 15) of the bolt (12), the size of the clamping opening (8, 9) and the countersunk portion (9) thereof, and the thickness of the bit (6) are relatively dimensioned such that the engagement point (26) of the clamping head (13) adjacent the free surface (14) thereof with the inner wall of the opening (8) of the bit (6) is lower or at least at the same level as the upper engagement point (27) of the bit (6) at a lateral abutment surface (4, 5) of the tool body with respect to planes extending parallel to the support surface (3).

9. Tool according to claim 1, wherein at least one of the surfaces formed on the conical intermediate portion (25) and of the elongated enlarged recess portion (19) is formed with projecting ridges or ribs (20a) to reduce engagement friction upon relative rotation of the bolt (12) in the bore (10) and consequent engagement of said surfaces while providing guidance between the bolt and the cutter body (1).

* * * * *